Patented Feb. 1, 1938

2,106,798

UNITED STATES PATENT OFFICE 2,106,798

PROCESS OF MAKING LOWER ALIPHATIC ACID ANHYDRIDES AND ALDEHYDES

Henry Dreyfus, London, England

No Drawing. Application November 1, 1935, Serial No. 47,797. In Great Britain November 24, 1934

16 Claims. (Cl. 260—123)

This invention relates to the manufacture of aliphatic compounds, and is more particularly concerned with the production of anhydrides and aldehydes from vaporous alkylidene diesters of lower aliphatic acids, for instance, the production of acetic anhydride and acetaldehyde from vaporous ethylidene diacetate.

According to the present invention anhydrides and aldehydes are produced by subjecting the vapor of alkylidene diesters of lower aliphatic acids to thermal decomposition while diluted with an inert gas or vapor. The presence of the diluent medium minimizes side reactions and too extensive decomposition which normally lead to the production of permanent gases, tars and other undesired products with consequent detriment to the yield of anhydride and aldehyde.

The invention is more particularly concerned with the thermal decomposition of ethylidene diacetate to produce acetic anhydride and acetaldehyde, but includes the thermal decomposition of ethylidene dipropionate, ethylidene dibutyrate, propylidene diacetate, butylidene diacetate, and other alkylidene diesters of lower aliphatic acids to produce the corresponding anhydrides and aldehydes.

The diluents which may be employed include gases such, for example, as carbon dioxide, methane and nitrogen, as well as vapors, for example of benzene or other hydrocarbons. A lower aliphatic acid or anhydride, particularly the acid or anhydride corresponding to the alkylidene diester to be decomposed, may likewise be employed as diluent; for instance, in the decomposition of ethylidene diacetate acetic acid or acetic anhydride may be employed as diluent. Air may also be used as a diluent but in this case oxidation of the aldehyde is liable to occur. Water vapor is also a suitable diluent but its use is not preferred, since it necessitates special precautions in the condensation and separation of the products of the thermal decomposition in order to prevent hydrolysis of the anhydride produced. More than one diluent may, of course, be employed.

The quantity of diluent employed is preferably such that it forms between 25 and 75% of the total volume of the vaporous alkylidene diester-diluent mixture.

The mixture of alkylidene diester and diluent to be passed into the zone in which the thermal decomposition is effected may be produced as desired. For instance separate streams of ester vapor and the diluent gas or vapor may be passed into a vessel, provided with baffles, or other devices ensuring adequate mixing, from which they are passed to the decomposition zone.

The thermal decomposition may be carried out most suitably at temperatures of about 300 to 400° C. although higher temperatures, e. g. up to 450° C. may be employed if desired. It should be remarked that in order to obtain the same conversion per unit of time by the present process as would be obtained in the absence of a diluent higher space velocities than usual may be employed, and in such circumstances the reaction zone may be maintained at a higher temperature than the actual reaction temperature. By so doing prolongation of the reaction zone otherwise necessary to cause the vapor to attain the thermal decomposition temperature is avoided.

The thermal decomposition is preferably carried out under normal atmospheric pressure or even reduced pressure, but, if desired, superatmospheric pressure may be employed.

Catalysts and/or filling materials may be employed to assist the decomposition, acids and acid salts, e. g. phosphoric acid, acid phosphates and acid sulphates (including pyrophosphates and pyrosulphates) particularly of alkali metals, being very useful in this connection.

The thermal decomposition may be carried out by passing the vaporous mixture of alkylidene diester and diluent through tubes or other forms of apparatus containing solid filling materials and/or catalysts and heated to the desired temperature. Alternatively the vaporous mixture may be passed through a bath of molten material consisting of or comprising one or more catalysts and maintained at a suitable temperature.

Separation of the aldehyde, anhydride and diluent may be effected conveniently by fractional condensation, whether or not the diluent employed is condensable.

The following example illustrates the invention but it is to be understood that this example is given solely by way of illustration and is not in any way limitative:—

*Example*

A mixture of equal volumes of vaporous ethylidene diacetate and carbon dioxide is passed in a rapid stream through a tube containing phosphoric acid upon pumice and maintained at a temperature of about 350–360° C.

The reaction products issuing from the tube are cooled to condense acetic anhydride, acetaldehyde and any unchanged ethylidene diacetate, the uncondensed gas being scrubbed with a suitable solvent, for instance glacial acetic acid, to recover any escaping acetaldehyde.

What I claim and desire to secure by Letters Patent is:—

1. Process for the production of an anhydride and an aldehyde of the lower aliphatic series, which comprises subjecting to thermal decomposition the vapor of an alkylidene diester of a lower aliphatic acid while diluted with at least one-third of its own volume of an inert gaseous medium.

2. Process for the production of an anhydride and an aldehyde of the lower aliphatic series, which comprises subjecting to thermal decomposition the vapor of an alkylidene diester of a lower aliphatic acid while diluted with ⅓ to 3 times its own volume of carbon dioxide.

3. Process for the production of an anhydride and an aldehyde of the lower aliphatic series, which comprises subjecting to thermal decomposition the vapor of an alkylidene diester of a lower aliphatic acid while diluted with ⅓ to 3 times its own volume of the vapor of said lower aliphatic acid.

4. Process for the production of an anhydride and an aldehyde of the lower aliphatic series, which comprises subjecting to thermal decomposition the vapor of an alkylidene diester of a lower aliphatic acid while diluted with ⅓ to 3 times its own volume of the vapor of the anhydride of said lower aliphatic acid.

5. Process for the production of an anhydride and an aldehyde of the lower aliphatic series, which comprises subjecting to thermal decomposition the vapor of an alkylidene diester of a lower aliphatic acid while diluted with about its own volume of inert gaseous medium.

6. Process for the production of an anhydride and an aldehyde of the lower aliphatic series, which comprises subjecting to thermal decomposition at temperatures of 300–400° C. the vapor of an alkylidene diester of a lower aliphatic acid while diluted with about its own volume of carbon dioxide.

7. Process for the production of an anhydride and an aldehyde of the lower aliphatic series, which comprises subjecting to thermal decomposition at temperatures of 300–400° C. the vapor of an alkylidene diester of a lower aliphatic acid while diluted with about its own volume of the vapor of said lower aliphatic acid.

8. Process for the production of an anhydride and an aldehyde of the lower aliphatic series, which comprises subjecting to thermal decomposition at temperatures of 300–400° C. the vapor of an alkylidene diester of a lower aliphatic acid while diluted with about its own volume of the vapor of the anhydride of said lower aliphatic acid.

9. Process for the production of acetic anhydride and acetaldehyde, which comprises subjecting to thermal decomposition the vapor of ethylidene diacetate while diluted with at least one-third of its own volume of an inert gaseous medium.

10. Process for the production of acetic anhydride and acetaldehyde, which comprises subjecting to thermal decomposition the vapor of ethylidene diacetate while diluted with ⅓ to 3 times its own volume of carbon dioxide.

11. Process for the production of acetic anhydride and acetaldehyde, which comprises subjecting to thermal decomposition the vapor of ethylidene diacetate while diluted with ⅓ to 3 times its own volume of acetic acid vapor.

12. Process for the production of acetic anhydride and acetaldehyde, which comprises subjecting to thermal decomposition the vapor of ethylidene diacetate while diluted with ⅓ to 3 times its own volume of acetic anhydride vapor.

13. Process for the production of acetic anhydride and acetaldehyde, which comprises subjecting to thermal decomposition the vapor of ethylidene diacetate while diluted with about its own volume of an inert gaseous medium.

14. Process for the production of acetic anhydride and acetaldehyde, which comprises subjecting to thermal decomposition at temperatures of 300–400° C. the vapor of ethylidene diacetate while diluted with about its own volume of carbon dioxide.

15. Process for the production of acetic anhydride and acetaldehyde, which comprises subjecting to thermal decomposition at temperatures of 300–400° C. the vapor of ethylidene diacetate while diluted with about its own volume of acetic acid vapor.

16. Process for the production of acetic anhydride and acetaldehyde, which comprises subjecting to thermal decomposition at temperatures of 300–400° C. the vapor of ethylidene diacetate while diluted with about its own volume of acetic anhydride vapor.

HENRY DREYFUS.